May 26, 1942.   S. HERMANN   2,284,053
GAS MASK
Filed May 23, 1941
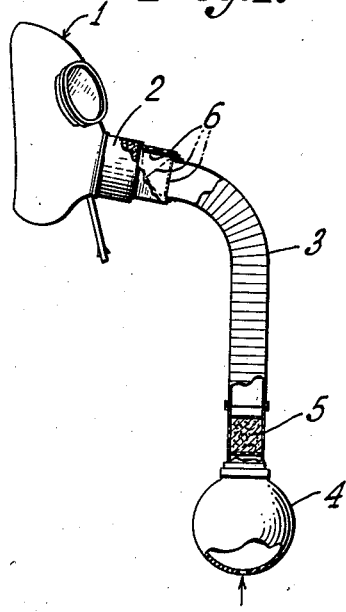
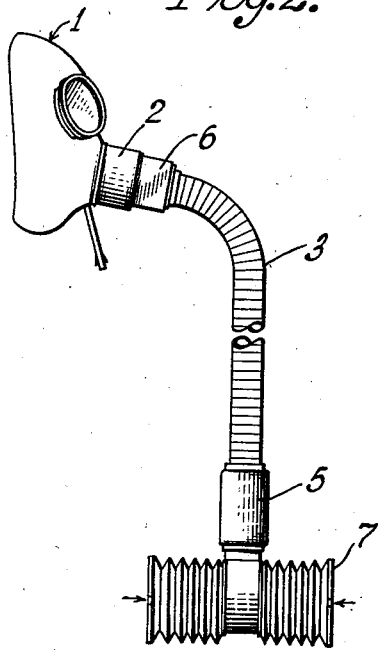
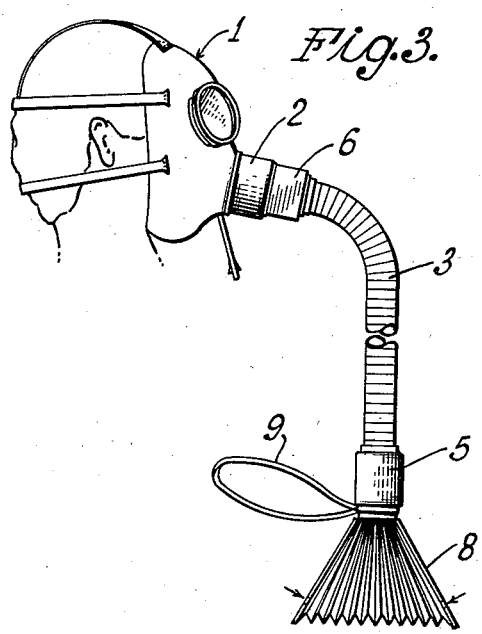
INVENTOR
Siegwart Hermann
BY Armand E. Mirken
ATTORNEY Patented May 26, 1942

2,284,053

UNITED STATES PATENT OFFICE 2,284,053

GAS MASK

Siegwart Hermann, New York, N. Y.

Application May 23, 1941, Serial No. 394,835
In France October 16, 1939

1 Claim. (Cl. 128—143)

This invention relates to improvements in gas masks.

The principal object matter of the invention is to facilitate breathing in gas masks. Gas masks are provided with filters which comprise substances suitable for the depoisoning of the air to be inhaled, e. g., activated charcoal. The breathing resistance of even the better filters in gas masks is so great that older or sick persons are seriously hampered. This holds true even when the person concerned is at rest. Respiratory difficulties and symptoms of suffocation take place. Younger and stronger persons are subject to similar difficulties while walking or working.

I am aware that it has been suggested to add to gas masks supplementary devices designed to blow air into the mask. This has been performed by providing the filter with small bellows, etc., comprising valves through which supplementary air is pumped into the filter. Devices of this kind will work only if pure air can be supplied to the gas mask. If, however, additional poisoned air is delivered by this device to the filter, there is danger that the filter will be unable to depoison all of the air. The efficiency of activated charcoal will diminish after a short time of use. Moreover, the depoisoning action will be less efficient in case of the air passing the filter too speedily. On the other hand, a person of nervous temperament or in rapid action will instinctively pump in the poisoned air at an ever increasing pace resulting in accelerated poisoning. This and irritating gases force the person affected to remove the gas mask.

Now, according to my invention, additional air is supplemented to gas masks which air is cleaned before reaching the depoisoning filter to a degree permitting only very small quantities of the poison to get to the filter. This is performed by adding an additional filter to the gas mask absorbing the poison in the air additionally supplemented. The additional air being forced mechanically through the pre-cleaning filter, according to this invention, there is no danger of respiratory difficulties and, therefore, the layer of absorbent charcoal, etc. in this filter can be compressed and relatively large.

According to my invention, the pre-cleaning filter is provided with a blowing device in such manner as to make pumping possible at work, in motion and at rest.

In the annexed drawing several performances of the invention are shown diagrammatically. Like numbers denote like parts.

Fig. 1 is a gas mask provided with a device according to this invention, to be operated by the hands.

Fig. 2 is a gas mask provided with a device according to this invention, to be operated by the legs.

Fig. 3 is a gas mask provided with a device according to this invention, to be operated under the armpit.

The gas mask 1 is provided with a regular filter 2 and a length of hose 3. The bellows 4 are designed to supply additional air to the gas mask. The additional filter 5 can be arranged in the hose 3 or (Fig. 2) between the bellows 4 and the hose 3. A valve 6 is arranged between the hose 3 and the filter 2. This valve is designed to permit the air to flow into the mask through filter 2 in case the bearer is unable to operate the bellows 4.

In the device shown by Fig. 1 the bellows consist of a rubber ball to be operated with the hands. This kind of gas mask is suitable, e. g., for persons at rest.

In the device shown by Fig. 2 the bellows comprise an accordion-like apparatus to be operated by moving the legs. This kind of gas mask is suitable, e. g. for persons at work.

In the device shown by Fig. 3 the bellows consist of a flat triangularly shaped apparatus to be operated under the armpit by persons in motion. A shoulder strap 9 facilitates holding of the bellows under the armpit.

It is understood that the ball according to Fig. 1, the accordion-like apparatus according to Fig. 2, and the triangularly shaped apparatus according to Fig. 3 may be handled not only in the manner described for each, but each may be handled in all three ways and any other suitable way. Numerous other changes and omissions may be made without departing from the spirit of my invention.

What I claim is:

A gas mask comprising a main filter and an additional pre-cleaning filter both of them containing a poison-absorbing agent, a hose connecting said two filters, a pump for pressing air through said pre-cleaning filter, hose and main filter preferably to be operated by the wearer of the gas mask, said pump being placed before the pre-cleaning filter, and a valve giving access to the air from without placed in said hose directly before its connection with the main filter, said valve being closed by the pressure of the air pumped through the filters and being opened when said pressure stops.

SIEGWART HERMANN.